United States Patent
Agrawal et al.

(10) Patent No.: US 11,838,677 B2
(45) Date of Patent: Dec. 5, 2023

(54) COMPOSITE PRESENTATION SURFACE AND PRESENTER IMAGING FOR A MULTIPLE CAMERA TRANSMITTING DEVICE IN A VIDEO COMMUNICATION SESSION

(71) Applicant: MOTOROLA MOBILITY LLC, Wilmington, DE (US)

(72) Inventors: Amit Kumar Agrawal, Bangalore (IN); Rahul B Desai, Hoffman Estates, IL (US); Bill Ryan, Libertyville, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 17/502,312

(22) Filed: Oct. 15, 2021

(65) Prior Publication Data

US 2023/0120371 A1   Apr. 20, 2023

(51) Int. Cl.
| | |
|---|---|
| *G06T 7/70* | (2017.01) |
| *H04N 5/268* | (2006.01) |
| *H04N 5/265* | (2006.01) |
| *H04L 65/403* | (2022.01) |
| *H04N 5/262* | (2006.01) |
| *G06V 40/10* | (2022.01) |
| *H04N 23/90* | (2023.01) |
| *G06V 20/40* | (2022.01) |

(52) U.S. Cl.
CPC .............. *H04N 5/268* (2013.01); *G06T 7/70* (2017.01); *G06V 20/40* (2022.01); *G06V 40/107* (2022.01); *H04L 65/403* (2013.01); *H04N 5/265* (2013.01); *H04N 5/2628* (2013.01); *H04N 23/90* (2023.01); *G06T 2207/10016* (2013.01); *G06T 2207/30201* (2013.01)

(58) Field of Classification Search
CPC ........ H04N 5/268; H04N 5/262; H04N 5/265; H04N 7/147; G06T 7/70
USPC ............................................. 348/14.01–14.16
See application file for complete search history.

(56) References Cited

U.S. PATENT DOCUMENTS

| | | | | |
|---|---|---|---|---|
| 5,239,373 A | * | 8/1993 | Tang ................... | H04N 1/00283 348/E7.083 |
| 9,491,374 B1 | * | 11/2016 | Avrahami .............. | H04N 7/147 |

(Continued)

OTHER PUBLICATIONS

Switching Control Apparatus KR 100220392 B1 (Noh Jae-Kyung); Date Published: Sep. 15, 1999.*

*Primary Examiner* — Melur Ramakrishnaiah
(74) *Attorney, Agent, or Firm* — Isidore PLLC

(57) ABSTRACT

An electronic device, computer program product, and method are provided that autonomously switch between first and second image streams of two image capturing devices during a video communication session, reducing data transmission and display size requirements for recipients. A controller of the electronic device identifies a person in the first image stream and identifies a writing surface in the second image stream. In response to determining that the person is not attending to the writing surface, the controller communicates, to at second electronic device(s) during the video communication session, at least a first portion of the first image stream that focusses on a face of the person. In response to determining that the person is attending to the writing surface, the controller communicates at least a second portion of the second image stream that focusses on the writing surface.

20 Claims, 11 Drawing Sheets

(56) References Cited

U.S. PATENT DOCUMENTS

| | | | | |
|---|---|---|---|---|
| 11,184,560 B1* | 11/2021 | Mese | ....................... | G10L 17/00 |
| 11,350,029 B1* | 5/2022 | Ostap | ................. | H04N 5/23296 |
| 2002/0188772 A1* | 12/2002 | Radcliffe | ......... | H04N 21/43072 |
| | | | | 348/E7.071 |
| 2014/0063177 A1* | 3/2014 | Tian | ....................... | H04N 7/152 |
| | | | | 348/E7.083 |
| 2015/0085060 A1* | 3/2015 | Fish | ....................... | H04N 5/247 |
| | | | | 348/14.03 |
| 2017/0094222 A1* | 3/2017 | Tangeland | ............. | H04N 23/51 |
| 2022/0272279 A1* | 8/2022 | Gupta | ................... | H04N 5/265 |

\* cited by examiner

COMPOSITE PRESENTATION SURFACE AND PRESENTER IMAGING FOR A MULTIPLE CAMERA TRANSMITTING DEVICE IN A VIDEO COMMUNICATION SESSION

BACKGROUND

1. Technical Field

The present disclosure relates generally to electronic devices that support and/or enable video communication sessions with second communication device(s), and more particularly to electronic devices that can communicatively connect to more than one local camera during a video communication session.

2. Description of the Related Art

Classroom instruction is increasingly being provided using video communication technology. Many institutions, such as schools, have added video display systems that enable a teacher or lecturer to write on a horizontal surface that is imaged and projected on a larger screen or communicated to remote display devices. Alternatively, the teacher or presenter can utilize a vertical writing surface (such as a whiteboard smartboard) to provide information to the other participants in the physical and virtual classroom/meeting. Those people who are physically in the classroom can see both the written content and the teacher, which is conducive to active listening and participation when the written content is not being directly referred to. Those participants who are viewing the teacher from the remote devices are restricted to seeing only the teacher or the writing surface, depending on the physical orientation of camera being used to support the online video communication.

Most teachers who teach remotely from home do not have the benefit of an elaborate video display system. As a workaround, some teachers attempt to use two communication devices to create the same effect at least to a degree. The teacher sits or stands facing a laptop camera for one image stream and positions a camera of a second device, such as a smartphone, to capture a writing surface. This workaround has several drawbacks. For example, two logins to a video communication session are required. Also, data transmission requirements are doubled, which can be problematic when communication capacity/bandwidth is limited. Additionally, many remote participants rely on the small display device of a smartphone to participate in the video communication session. The receiving device has to be able to present both image streams simultaneously with sufficient size for written content to be legible. Alternatively, the user interface of the receiving device has to be manually toggled between the two image streams in order to have a single image of sufficient size.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
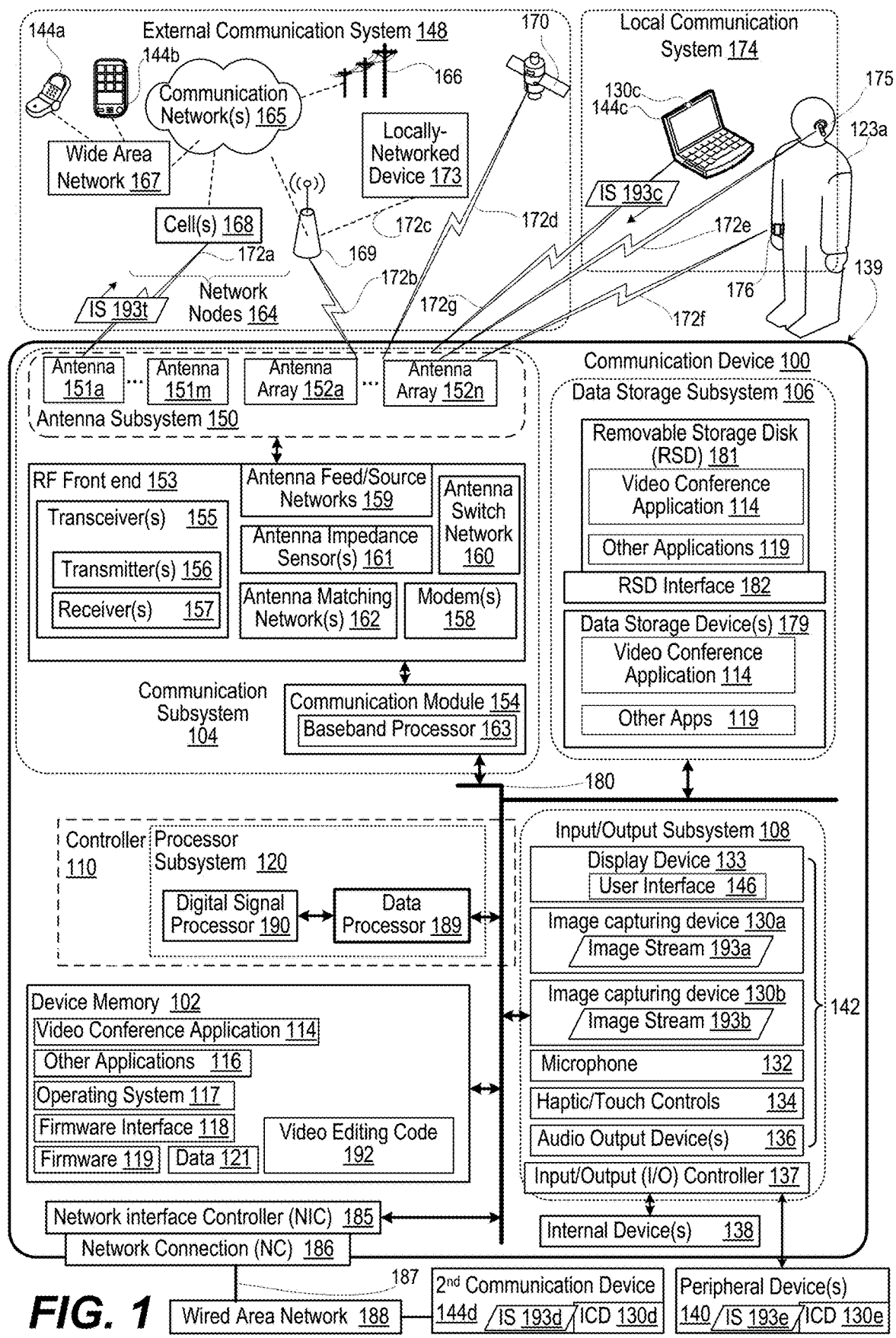
FIG. 1 depicts a functional block diagram of a communication environment including a communication device having components that automatically select and communicate an image stream from more than one local image capturing devices, and within which the features of the present disclosure are advantageously implemented, according to one or more embodiments.

According to a first aspect of the present disclosure, an electronic device, a computer program product, and a method are provided that automatically selects the more relevant or meaningful, locally available image stream for instruction among more than one image streams to communicate to a video communication session. The disclosure provides for a reduction in the data rate requirements of the video communication session by restricting/withholding communication of less relevant image stream(s). Having more than one image capturing device enables focussing on different portions of available display content, such as the teacher and a writing surface. In addition, recipient user(s) of receiving electronic devices can successfully understand visual information on a small display device, as the communicated image stream focusses a selected one of the image capturing devices. The electronic device includes at least two image capturing devices. A first image capturing device provides a first image stream and a second image capturing device provides a second image stream. The electronic device includes at least one network interface that communicatively connects the electronic device via a network to at least one second electronic device during a video communication session. A controller of the electronic device is communicatively coupled to each of the at least two image capturing devices and the at least one network interface. During the video communication session with the at least one second electronic device, the controller identifies a person in the first image stream and identifies a writing surface in the second image stream. In response to determining that the person is not attending to the writing surface, the controller communicates, to at least the at least one second electronic device, at least a first portion of the first image stream that focusses on a face of the person. In response to determining that the person is attending to the writing surface, the controller communicates, to the at least one second electronic device, at least a second portion of the second image stream that focusses on the writing surface.

Electronic devices such as mobile phones, network servers, desktop workstations, laptops, and tablets are often used to participate in or to enable online human communication exchange. So as to simulate an in-person teaching or lecture, a teacher in a video communication session generally positions themself within the field of view of the local camera and within detection range of the microphone. The respective image and audio streams are communicated to the video communication session for presentation by one or more second electronic devices. A video communication session can include exchanges of audio, video, and data from each communication device to the other communication devices. The present innovation provides a better experience for remote viewers of the image stream.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

FIG. 1 depicts a functional block diagram of an electronic device, specifically communication device 100, within an operating environment and within which several of the features of the present disclosure are advantageously implemented. Referring now to the specific component makeup and the associated functionality of communication device 100. In one or more embodiments, communication device 100 has device memory 102, communication subsystem 104, data storage subsystem 106, and input/output (I/O) subsystem 108. Device memory 102 and each subsystem (104, 106, and 108) are managed by controller 110. Device memory 102 includes program code for applications, such as video conference application 114, and other application(s) 116. Device memory 102 further includes operating system (OS) 117, firmware interface 118, such as basic input/output system (BIOS) or Uniform Extensible Firmware Interface (UEFI), and firmware 119.

Controller 110 includes processor subsystem 120 that executes program code to provide operating functionality of communication device 100. The software and/or firmware modules have varying functionality when their corresponding program code is executed by processor subsystem 120 or secondary processing devices within communication device 100. Processor subsystem 120 of controller 110 can execute program code of video conference application 114 and other application(s) 116 to configure communication device 100 to perform specific functions. Device memory 102 can include data 121 used by the applications.

I/O subsystem 108 includes user interface components such as image capturing devices 130a-130b, microphone 132, display device 133, touch/haptic controls 134, and audio output device(s) 136. In an example, image capturing devices 130a-130b are front and back cameras. In another example, image capturing devices 130a-130b are on the same side but have different lenses, such as two different ones of telephoto, wide angle, macro, or general purpose lenses. I/O subsystem 108 also includes I/O controller 137. I/O controller 137 connects to internal devices 138, which are internal to housing 139, and to peripheral devices 140, such as external speakers, which are external to housing 139 of communication device 100. Internal devices 138 include computing, storage, communication, or sensing components depicted within housing 139. I/O controller 137 supports the necessary configuration of connectors, electrical power, communication protocols, and data buffering to act as an interface between internal devices 138 and peripheral devices 140 and other components of communication device 100 that use a different configuration for inputs and outputs.

Communication device 100 is managed by controller 110, which is communicatively coupled to image capturing devices 130a-130b and to at least one user interface device 142, such as at least one microphone 132. Image capturing device 130a and user interface device 142 allow a participant using communication device 100 to be an active participant in a video communication session with a second participant using a corresponding one of second communication device 144a-144d that can be similarly configured and/or provide similar functionality as communication device 100. Controller 110 is also communicatively coupled to at least one display device 133 that presents user interface 146 for the video communication session. Controller 110 executes video conference application 114 stored in device memory 102 to configure communication device 100 to enable communication with second communication devices 144a-144d in the video communication session. It is appreciated that second communication device 144a-144d can be identically or similarly equipped with components and functionality described for communication device 100. According to aspects of the present disclosure, communication device 100 can be communicatively coupled to one or more of image capturing devices ("ICC") 130c-130e respectively of second communication devices 144c/144d and peripheral device 140.

Each of communication device 100 and second communication devices 144a-144d can be one of a host of different types of devices, including but not limited to, a mobile cellular phone, satellite phone, or smart-phone, a laptop, a net-book, an ultra-book, a networked smart watch or networked sports/exercise watch, and/or a tablet computing device or similar device that can include wireless and/or wired communication functionality. As an electronic device supporting wireless communication, communication device 100 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices connected to a wireless modem. Within the description of the remaining figures, references to similar components presented in a previous figure are provided the same reference numbers across the different figures. Where the named component is presented with different features or functionality, a different reference numeral or a subscripted reference numeral is provided (e.g., 100a in place of 100).

Referring now to the communication components and features of communication device 100. Communication subsystem 104 of communication device 100 enables wireless communication with external communication system 148. Communication subsystem 104 includes antenna subsystem 150 having lower band antennas 151a-151m and higher band antenna arrays 152a-152n that can be attached in/at different portions of housing 139. Communication subsystem 104 includes radio frequency (RF) front end 153 and communication module 154. RF front end 153 includes transceiver(s) 155, which includes transmitter(s) 156 and receiver(s) 157. RF front end 153 further includes modem(s) 158. RF front end 153 includes antenna feed/source networks 159, antenna switch network 160, antenna impedance sensor(s) 161, and antenna matching network(s) 162. Communication module 154 of communication subsystem 104 includes baseband processor 163 that communicates with controller 110 and RF front end 153. Baseband processor 163 operates in a baseband frequency range to encode data for transmission and decode received data, according to a communication protocol. Modem(s) 158 modulate baseband encoded data from communication module 154 onto a carrier signal to provide a transmit signal that is amplified by transmitter(s) 156. Modem(s) 158 demodulates each signal received from external communication system 148 used by antenna subsystem 150. The received signal is amplified and filtered by receiver(s) 157, which demodulate received encoded data from a received carrier signal. Antenna feed/source networks 159 transmits or receives from elements of antenna subsystem 150 and can adjust a phase between elements of antenna subsystem 150. Antenna switch network 160 can connect particular combinations of antennas (151a-151m, 152a-152n) to transceiver(s) 155. Controller 110 can monitor changes in antenna impedance detected by antenna impedance sensor(s) 161 in order to determine portions of antenna subsystem 150 that are blocked. Antenna matching network(s) 162 are connected to particular lower band antennas 151a-151m to tune impedance respectively of lower band antennas 151a-151m to match impedance of transceiver(s) 155. Antenna matching network(s) 162 can also be used to detune the impedance of lower band antennas 151a-151m to not match the impedance of transceiver(s) 155 to electromagnetically isolate a particular antenna.

In one or more embodiments, controller 110, via communication subsystem 104, performs multiple types of over-the-air (OTA) communication with network nodes 164 of external communication system 148. Particular network nodes 164 can be part of communication networks 165 of public land mobile networks (PLMNs) that provide connections to plain old telephone systems (POTS) 166 for voice calls and wide area networks (WANs) 167 for data sessions. WANs 167 can include Internet and other data networks to communication device 100 and second communication devices 144a/144b. The particular network nodes 164 can be cellular "cells", base nodes, or base stations 168 that support cellular OTA communication using radio access technology (RAT) utilized by a radio access network (RAN). Unlike earlier generations of cellular services, where voice and data were handled using different RATs, both are now integrated with voice being considered one kind of data communication. Conventionally, broadband, packet-based transmission of text, digitized voice, video, and multimedia communication are provided using Fourth generation (4G) RAT of evolved UTMS radio access (E-UTRA), referred to a Long Term Evolved (LTE), although some cellular data service is still being provided by third generation (3G) Universal Mobile Telecommunications Service (UMTS). A fifth generation (5G) RAT, referred to as fifth generation new radio (5G NR), is being deployed to at least augment capabilities of 4G LTE with a yet higher capability of data transfer. Development continues for what will be six generation (6G) RATs and more advanced RATs. With wireless frequency spectrum seemingly ever expanding, additional antennas (151a-151m, 152a-152n) are incorporated to support newer radio access technologies (RATs) and multi band operation. Dual low band (2L) or quad low band (4L) multiple input multiple output (MIMO) operation dictates multiple antennas communicate on multiple bands simultaneously.

In one or more embodiments, network nodes 164 can be access node(s) 169 that support wireless OTA communication. Communication subsystem 104 can receive OTA communication from location services such as provided by global positioning system (GPS) satellites 170. Communication subsystem 104 communicates via OTA communication channel(s) 172a with base stations 168. Communication subsystem 104 communicates via wireless communication channel(s) 172b with access node(s) 169. In one or more particular embodiments, access node(s) 169 supports communication using one or more IEEE 802.11 wireless local area network (WLAN) protocols. Wi-Fi™ is a family of wireless network protocols, based on the IEEE 802.11 family of standards, which are commonly used between user devices and network devices that provide Internet access. In one or more particular embodiments, communication subsystem 104 communicates with one or more locally networked devices 173 via wired or wireless link 172c provided by access node(s) 169. Communication subsystem 104 receives downlink broadcast channel(s) 172d from GPS satellites 170 to obtain geospatial location information.

In one or more embodiments, controller 110, via communication subsystem 104, performs multiple types of OTA communication with local communication system 174. In one or more embodiments, local communication system 174 includes wireless headset 175 and smart watch 176 that are coupled to communication device 100 to form a personal access network (PAN). Communication subsystem 104 communicates via low power wireless communication channel(s) 172e with wireless headset 175. Communication subsystem 104 communicates via second low power wireless communication channel(s) 172f, such as Bluetooth, with smart watch 176 such as used by local participant 123a. In one or more particular embodiments, communication subsystem 104 communicates with second communication device(s) 144c via wireless link 172g to form an ad hoc network.

Data storage subsystem 106 of communication device 100 includes data storage device(s) 179. Controller 110 is communicatively connected, via system interlink 180, to data storage device(s) 179. Data storage subsystem 106 provides applications, program code, and stored data on nonvolatile storage that is accessible by controller 110. For example, data storage subsystem 106 can provide a selection of applications and computer data such as video conference application 114 and other application(s) 116 that use communication services. These applications can be loaded into device memory 102 for execution by controller 110. In one or more embodiments, data storage device(s) 179 can include hard disk drives (HDDs), optical disk drives, and/or solid-state drives (SSDs), etc. Data storage subsystem 106 of communication device 100 can include removable storage device(s) (RSD(s)) 181, which is received in RSD interface 182. Controller 110 is communicatively connected to RSD 181, via system interlink 180 and RSD interface 182. In one or more embodiments, RSD 181 is a non-transitory computer program product or computer readable storage device. Controller 110 can access RSD 181 or data storage device(s) 179 to provision communication device 100 with program code, such as code for video conference application 114 and other application(s) 116.

In one or more embodiments, I/O subsystem 108 includes network interface controller (NIC) 185 with a network connection (NC) 186 on housing 139. Network cable 187 connects NC 186 to wired area network 188. NIC 185 can be referred to as a "network interface" that can support one or more network communication protocols. Wired area network 188 can be a local area network (LAN), a campus area network (CAN), a metropolitan area network (MAN), or a wide area network (WAN). For example, NC 186 can be an Ethernet connection. Second communication devices 144d is communicatively coupled to wired area network 188.

Controller 110 manages, and in some instances directly controls, the various functions and/or operations of communication device 100. These functions and/or operations include, but are not limited to including, application data processing, communication with second communication devices, navigation tasks, image processing, and signal processing. In one or more alternate embodiments, communication device 100 may use hardware component equivalents for application data processing and signal processing. For example, communication device 100 may use special purpose hardware, dedicated processors, general purpose computers, microprocessor-based computers, micro-controllers, optical computers, analog computers, dedicated processors and/or dedicated hard-wired logic.

Controller 110 includes processor subsystem 120, which includes one or more central processing units (CPUs), depicted as data processor 189. Processor subsystem 120 can include one or more digital signal processors 190 that are integrated with data processor 189. Processor subsystem 120 can include other processors that are communicatively coupled to data processor 189, such as baseband processor 163 of communication module 154. In one or embodiments that are not depicted, controller 110 can further include distributed processing and control components that are external to housing 139 or grouped with other components, such as I/O subsystem 108. Data processor 189 is communicatively coupled, via system interlink 180, to device memory 102. In one or more embodiments, controller 110 of communication device 100 is communicatively coupled via system interlink 180 to communication subsystem 104, data storage subsystem 106, and I/O subsystem 108.

In one or more embodiments, processor subsystem 120 executes video editing code 192, such as stored in device memory 102 to dynamically create an alternate or substitute image stream, such as a resized version of image stream 193a-193e received from corresponding image capturing device 130a-130e. In an example, video editing code 192 when executed by image capturing device 130a, data processor 189 or digital signal processors 190 may create a resized version of an entirety or a portion of image stream 193a-193e. A portion of image stream 193a-193e may be cropped, changing a range of included array of pixels to a reduced number. A portion or the entirety of image stream 193a-193e can be stretched or compressed in one or two dimensions. The amount of stretching or compression can be different in the vertical and horizontal axes. In one or more embodiments, cropping and resizing is driven by one of the two dimensions that constrains presentation while maintaining an aspect ratio of the cropped portion.

System interlink 180 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (system interlink 180) are illustrated in FIG. 1, it is to be understood that more, fewer, or different interconnections may be present in other embodiments.

In one aspect, communication device 100 can function as a "transmitting device", selecting between locally obtained image stream 193a-193d to communicate to one or more second communication devices 144a-144b that function as "receiving device(s)" for remote participants. In an example, image capturing devices 130a-130b of communication device 100 can provide at least two image streams 193a-193b, respectively. In another example, at least one of second communication devices 144c-144d is available locally to communication device 100 providing respective image stream(s) 193c-193d to controller 110. In an additional example, peripheral device 140 has image capturing device 130e that provides image stream 193e to controller 110. Controller 110 configures communication device 100 and the communicatively-connected one or more second communication devices 144c-144e and peripheral device 140 to perform functionality described herein for selecting and communicating a relevant image stream. In an example, controller 110 executes video conference application 114, stored in a computer readable medium, such as device memory 102, to automatically select at least one relevant locally available image streams 193c-193d among more than one image streams 193c-193d to communicate to a video communication session.

Figure 2:
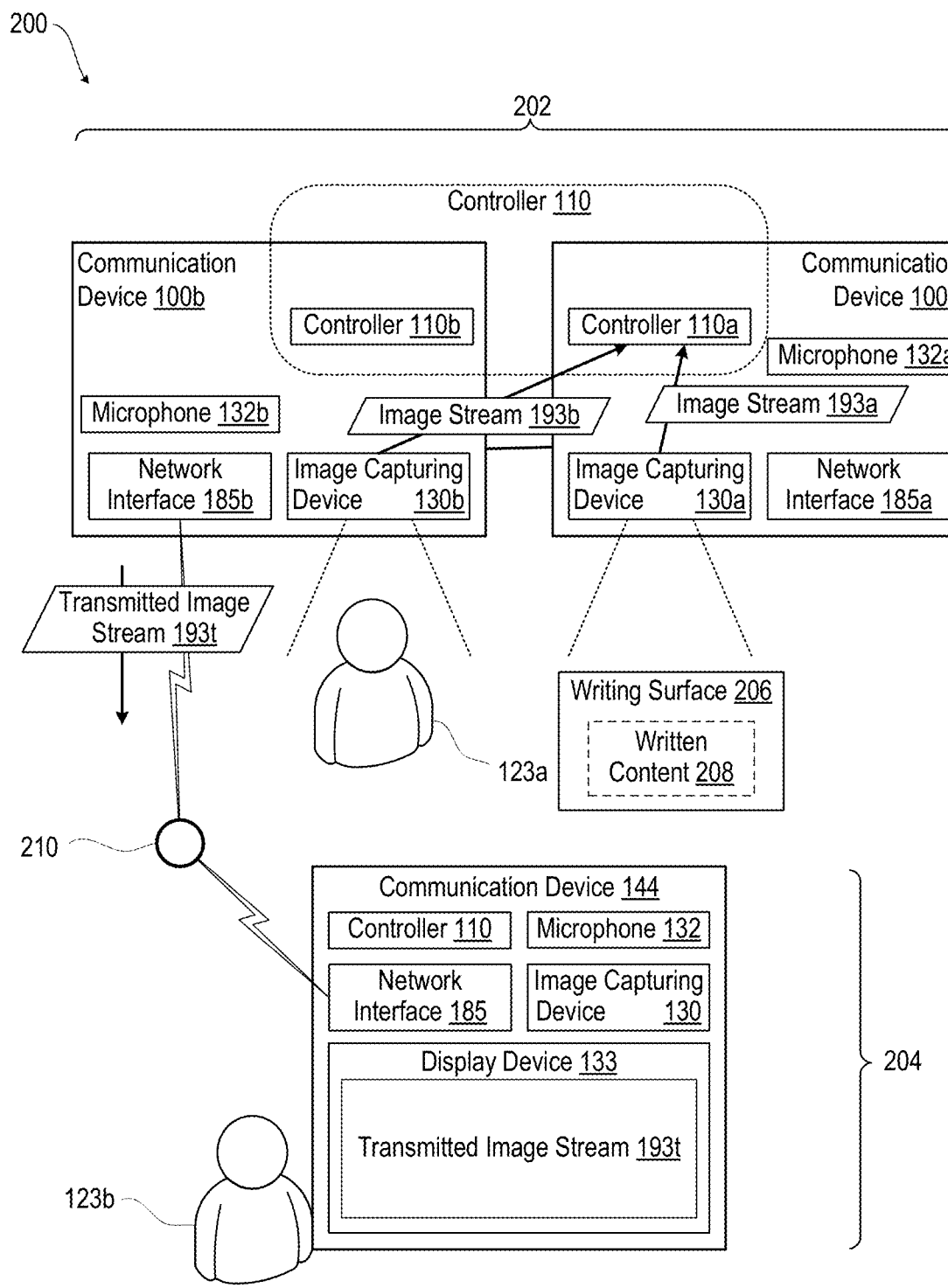
FIG. 2 depicts a functional block diagram of a communication environment including two local communication devices that operate together to automatically communicate at least one image stream of more than one image stream to a receiving communication device during a video communication session, according to one or more embodiments.

FIG. 2 depicts a functional block diagram of communication environment 200 having local environment 202 including a transmitting device and remote environment 204 including a receiving device. Local environment 202 includes two local communication devices 100a-100b that are communicatively coupled to operate together for automatically capturing and selecting at least one image stream (193a-193b) of more than one image streams 193a-193b during a video communication session. Communication devices 100a-100b can be communicatively linked via one or more wired or wireless connections described herein. In an example, communication device 100a includes controller 110a, image capturing device 130a, microphone 132a, and network interface 185a. Communication device 100a has image capturing device 130a positioned to have a field of view (FOV) that incorporates, in image stream 193a, writing surface 206 that can contain written content 208. Communication device 100b includes controller 110b, image capturing device 130b, microphone 132b, and network interface 185b. Communication device 100b has image capturing device 130b positioned to have a FOV that incorporates, in image stream 193b, local participant 123a. One or both of controllers 110a-110b manage the functionality described herein to function as controller 110. In an example, controller 110a of communication device 100a receives and selects between multiple image streams 193a-193b for a specific image stream to communicate as transmitted image stream 193t to video communication session, via network interface 185b and network 210. Network 210 can include one or more wired and wireless communication channels that communicatively connect communication devices 100a-100b to remote environment 204 of communication environment 200. Remote environment 204 includes at least one second communication device 144 having display device 133 that presents transmitted image stream 193t for viewing by remote participant 123b. In an example, second communication device 144 is similarly equipped with controller 110, image capturing device 130, microphone 132, and network interface 185 to enable two-way audiovisual participation in the video communication session.

Figure 3:
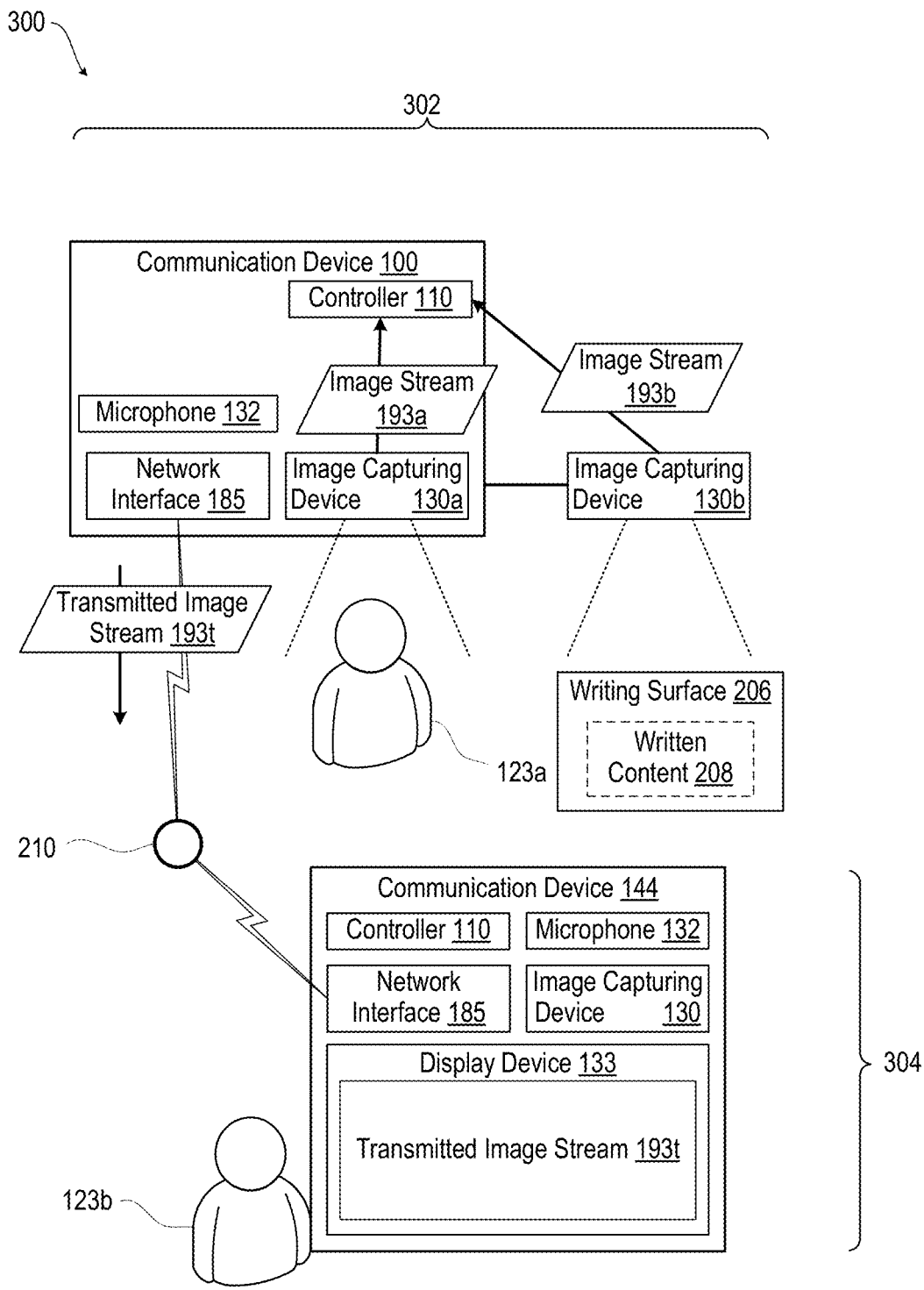
FIG. 3 depicts a functional block diagram of a communication environment including one local communication device that automatically communicates at least one image stream of more than one image stream to a receiving communication device during a video communication session, according to one or more embodiments.

FIG. 3 depicts a functional block diagram of communication environment 300 having local environment 302 that is communication device 100 acting as a transmitting device and having remote environment 304 that is second communication device 144 acting as a receiving device. Communication device 100 includes controller 110, image capturing device 130a, microphone 132, and network interface 185. Controller 110 is communicatively coupled to image capturing device 130b that is external to communication device 100 and is positioned to have a FOV that incorporates, in image stream 193a, writing surface 206 that can contain written content 208. Image capturing device 130b, is positioned to have a FOV that incorporates, in image stream 193b, local participant 123a. Controller 110 configures communication device 100 to automatically capture and select at least one image stream (193a-193b) of more than one image streams 193a-193b during a video communication session. Communication device 100 and image capturing device 130b can be communicatively linked via one or more wired or wireless connections described herein. Second communication device 144 has display device 133 that presents transmitted image stream 193 for viewing by remote participant 123b. In an example, second communication device 144 is similarly equipped with controller 110, image capturing device 130, microphone 132, and network interface 185 to enable two-way audiovisual participation in the video communication session.

Figure 4:
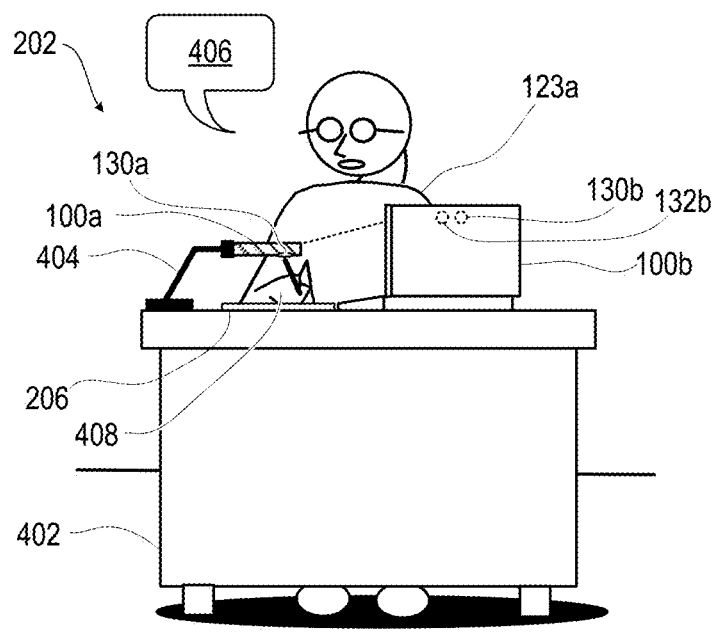
FIG. 4 depicts a front view of an example communication environment having a local (transmitting) environment that includes two image capturing devices with two different field of views (FOVs) used by a local participant attending to a writing surface, according to one or more embodiments.

FIG. 4 depicts a front view of local (transmitting) environment 202 (communication devices 100a-100b) of example communication environment 200 (FIG. 2). Communication devices 100a-100b are positioned on desk 402 proximate to local participant 123a. In an example, communication device 100a is a smartphone held by docking fixture 404 and includes image capturing device 130a. Image capturing device 130a produces image stream 193a. Communication device 100b is a laptop having image capturing device 130b and microphone 132b. Image capturing device 130a produces image stream 193b. Local participant 123a is looking away from communication device 100b while producing speech 406 that is captured as an audio input to microphone 132b. Local participant 123a is attending to writing surface 206 by using hand 408 of local participant 123a to write on writing surface 206.

Figure 5:
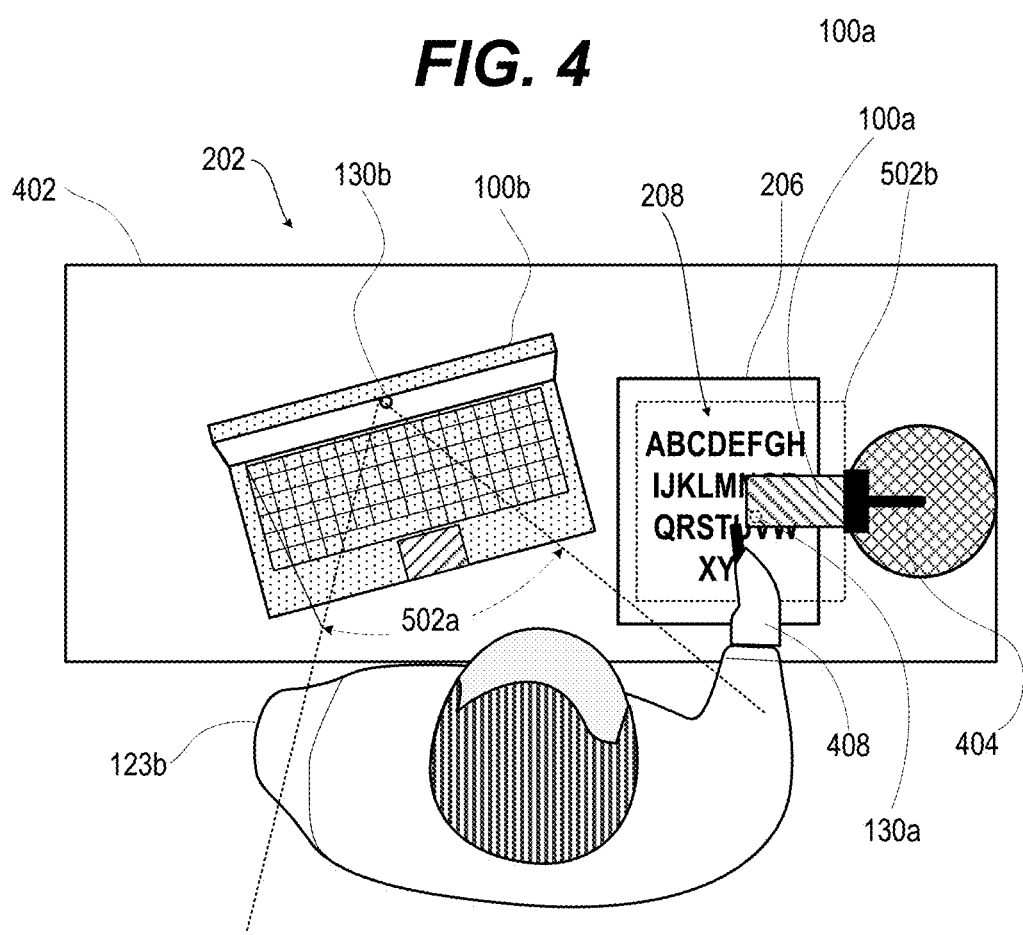
FIG. 5 depicts a top view of the local (transmitting) environment of the example communication environment of FIG. 4 having a first FOV that incorporates the local participant and a second FOV that incorporates the writing surface, according to one or more embodiments.

FIG. 5 depicts a top view of local (transmitting) environment 202 of example communication environment 200 (FIG. 2) that includes image capturing device 130a having first FOV 502a that incorporates writing surface 206 with written content 208. Docking fixture 404 positions communication device 100a over writing surface 206. In one or more embodiments, writing surface can be vertically aligned rather than horizontally aligned. A dock that holds communication device 100a in an upright, vertical position can be used to position image capturing device 130a to capture a vertical writing surface. Communication environment 200 includes image capturing device 130b having second FOV 502b that incorporates local participant 123a. Local participant 123a is shown gazing away from image capturing device 130b while attending to writing surface 206 by referencing or adding to written content 208. Controller 110 (FIG. 1) can determine that written content 208 is more relevant to the video communication session than a face of local participant 123a by determining that local participant 123a is attending to writing surface 206. In an example, controller 110 (FIG. 1) determines that local participant 123a is attending to writing surface 206 by determining one or more of: (i) local participant 123a is gazing toward at least one display device 133b that incorporates second image capturing device 130b; (ii) identifying one hand of local participant 123a incorporated in second image stream 193b proximate to writing surface 206 and that local participant 123a is gazing toward the one hand that is identified; and (iii) written content 208 is being added by hand 408 to writing surface 206.

In response, controller 110 (FIG. 1) can automatically select first image stream 193a for incorporating into transmitted image stream 193t for communicating to second communication device 144 (FIG. 2).

Figure 6:
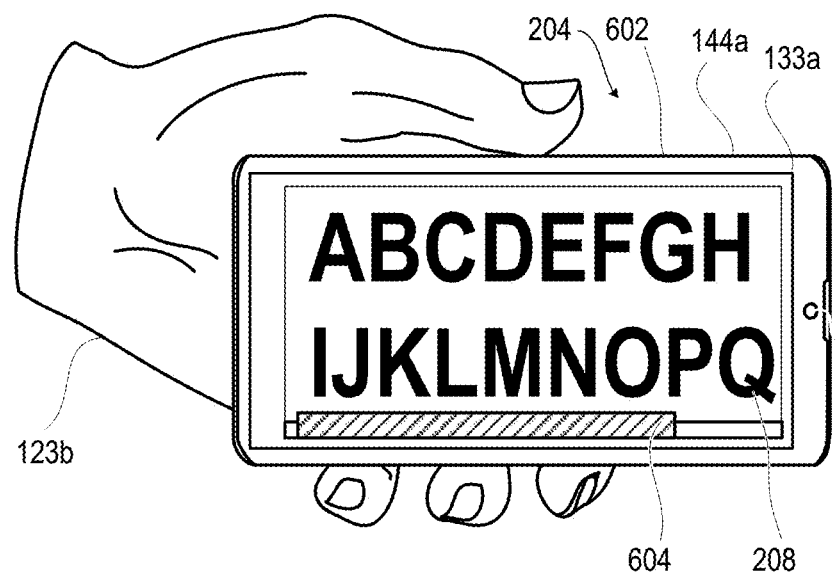
FIG. 6 depicts a front view of a remote (receiving) environment of the example communication environment that includes at least one second communication device having a small display device that presents the image stream of the writing surface, according to one or more embodiments.

FIG. 6 depicts a front view of remote (receiving) environment 204 of example communication environment 200 (FIG. 2) that includes second communication device 144a that presents, within session user interface 602, transmitted image stream 193t. Transmitted image stream 193t at least emphasizes and is predominated by first image stream 193a incorporating writing surface 206 (FIG. 2). Written content 208 can be sized to be sufficiently legible when presented on display device 133a of second communication device 144. Due to the small display size, the longer dimension of transmitted image stream 193t, which is horizontal, is oriented to correspond with the larger dimensions of display device 133a. In one or more embodiments, automatic display rotation is automatically disabled to prompt manually orienting second communication device 144a. In one or more embodiments, automatic rotation remains enabled, relying on the user to rotate the display device 133a to the appropriate orientation for legible presentation of written content 208. To be sufficiently legible, session user interface 602 can also include horizontal/vertical scroll controls 604 to pan across written content 208. Controller 110 (FIG. 1) determines a minimum size of written content 208 for legibility and creates horizontal/vertical scroll controls 604 when display device 133a fails to have sufficient size to simultaneously display all of written content 208.

Figure 7:
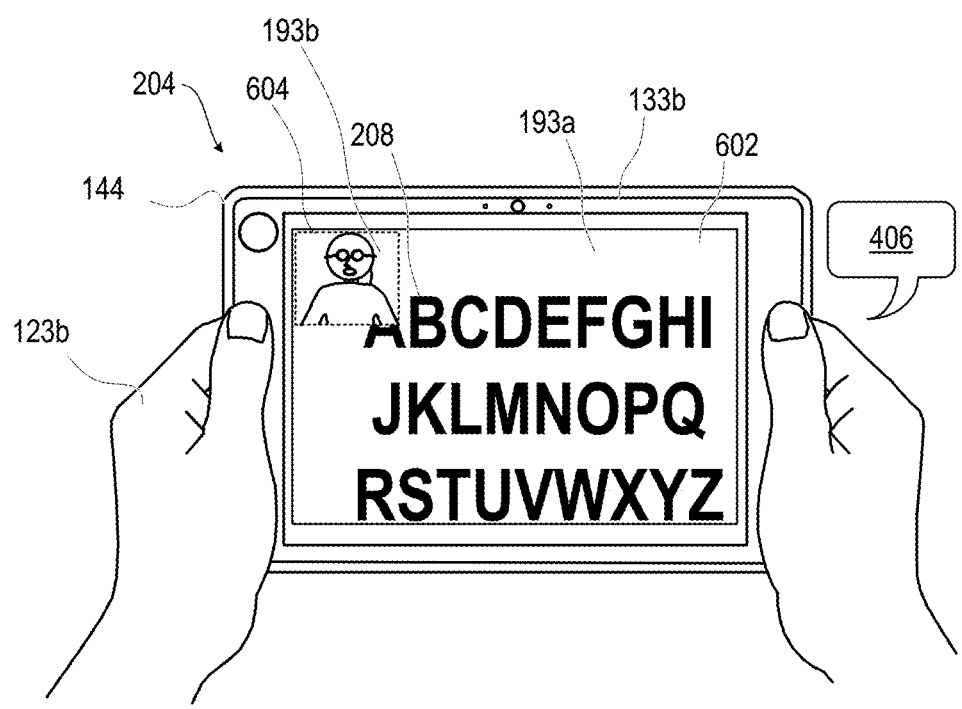
FIG. 7 depicts a front view of a remote (receiving) environment of the example communication environment that includes a second communication device having a larger display device that presents the image stream of the writing surface as well as other received content, according to one or more embodiments.

FIG. 7 depicts a front view of remote (receiving) environment 204 of example communication environment 200 that includes second communication device 144b. Display device 133b presents, within session user interface 702, transmitted image stream 193t that at least emphasizes and is predominated by first image stream 193a incorporating writing surface 206 (FIG. 2). Written content 208 can be sized to be sufficiently legible when presented on display device 133 of second communication device 144. Since display device 133b is larger than display device 133a of second communication device 144a (FIG. 6), additional visual content such as picture in picture (PIP) 604 of second image stream 193b can be presented. Second communication devices 144 also presents speech 406 as an audio output.

Figure 8:
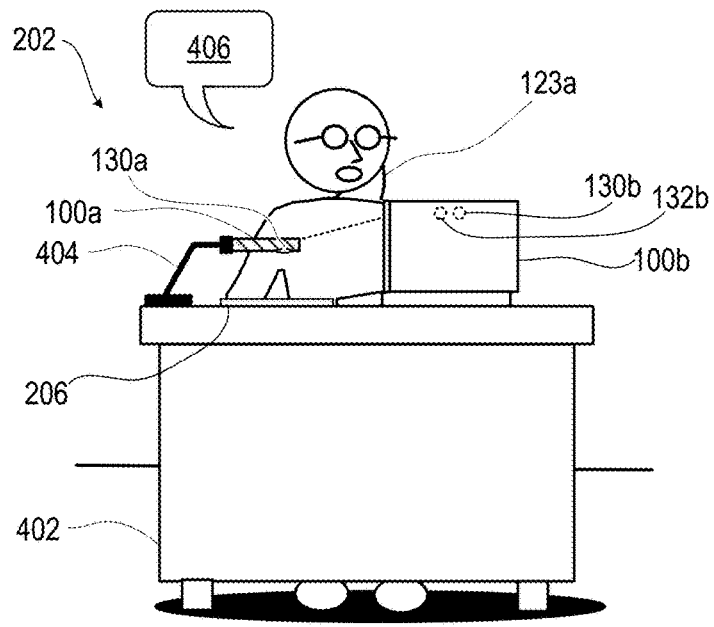
FIG. 8 depicts a front view of the local (transmitting) environment of the example communication environment used by the local participant who is not attending to the writing surface, according to one or more embodiments.
Figure 9:
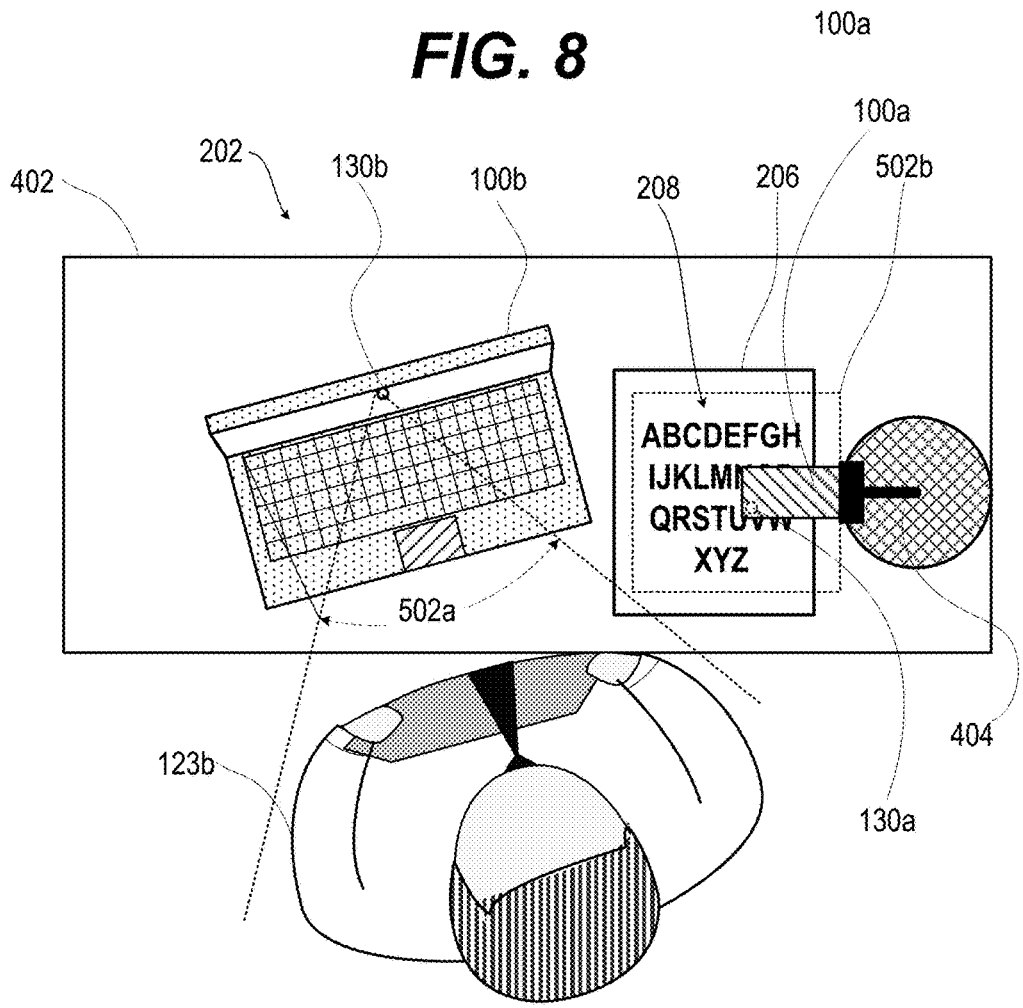
FIG. 9 depicts a top view of the local (transmitting) environment of the example communication environment used by the local participant who is not attending to the writing surface, according to one or more embodiments.

FIGS. 8-9 depict a front view and a top view respectively of local (transmitting) environment 202 of example communication environment 200 used by local participant 123a who is not attending to writing surface 206. In an example, controller 110 (FIG. 1) determines that local participant 123a is gazing toward second image capturing device 130b and not toward writing surface 206. With particular reference to FIG. 8, controller 110 (FIG. 1) can determine that hand 408 (FIG. 4) of local participant 123a is not adding to written content 208 on writing surface 206. In an example, controller 110 (FIG. 1) tracks spatial coordinates of written content 208 on writing surface 206, identifying new written content 208 that appears on previously blank coordinates on writing surface 206. Controller 110 (FIG. 1) identifies when writing surface is erased or replaced to provide empty portions that previously contained written content 208 in order to identify new written content 208 on the empty portions. In response, controller 110 (FIG. 1) can automatically select second image stream 193b for incorporating into transmitted image stream 193t for communicating to second communication device 144 (FIG. 2).

Figure 10:
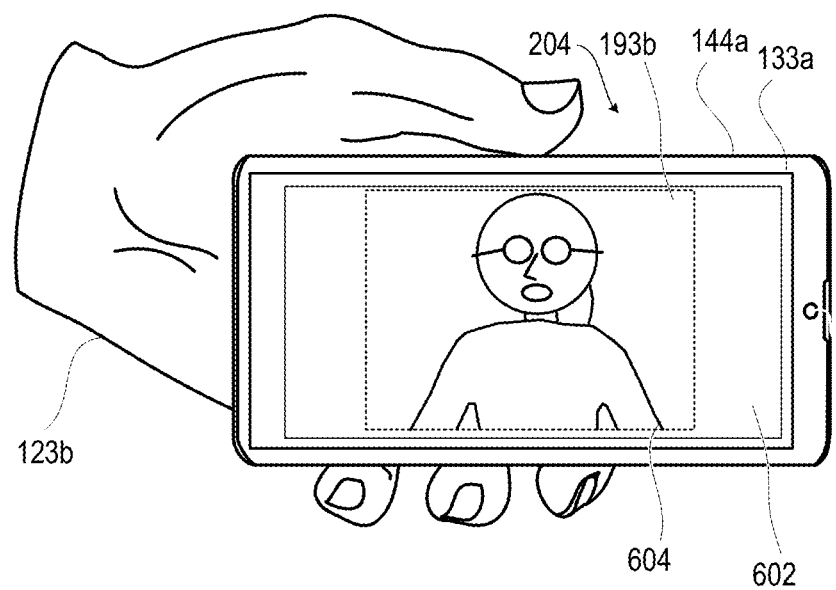
FIG. 10 depicts a front view of the remote (receiving) environment of the example communication environment that includes the second communication device having the small display device that presents the image stream of the local participant, according to one or more embodiments.

FIG. 10 depicts a front view of remote (receiving) environment 204 of example communication environment 200 that includes second communication device 144a that presents, within session user interface 602, transmitted image stream 193t. Transmitted image stream 193t at least emphasizes and is predominated by second image stream 193b incorporating local participant 123a (FIG. 2). Due to not including written content 208 (FIG. 2), features such as auto display rotation can be enabled with second image stream 193b sized to fit display device 133a.

Figure 11:
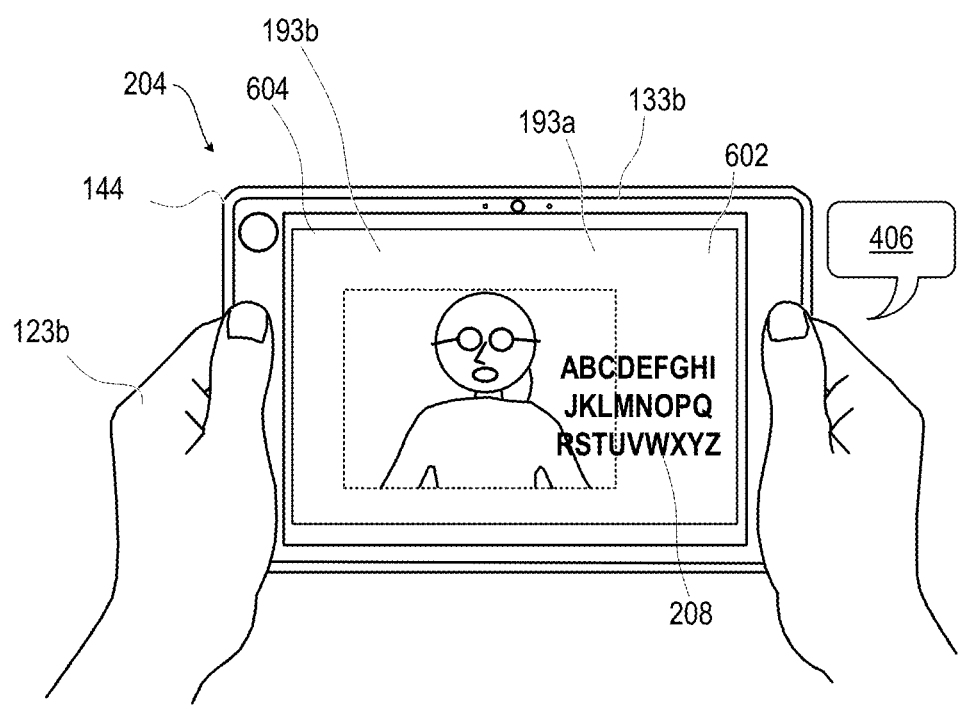
FIG. 11 depicts a front view of the remote (receiving) environment of the example communication environment that includes at least the second communication device having the larger display device that presents the image stream of the local participant as well as additional received content, according to one or more embodiments.

FIG. 11 depicts a front view of remote (receiving) environment 204 of example communication environment 200 that includes second communication device 144b with the larger display size than second communication device 144a (FIG. 10). Display device 133b presents, within session user interface 702, transmitted image stream 193t that at least emphasizes and is predominated by second image stream 193a but also incorporates written content 208 at a minimum size.

Figure 12:
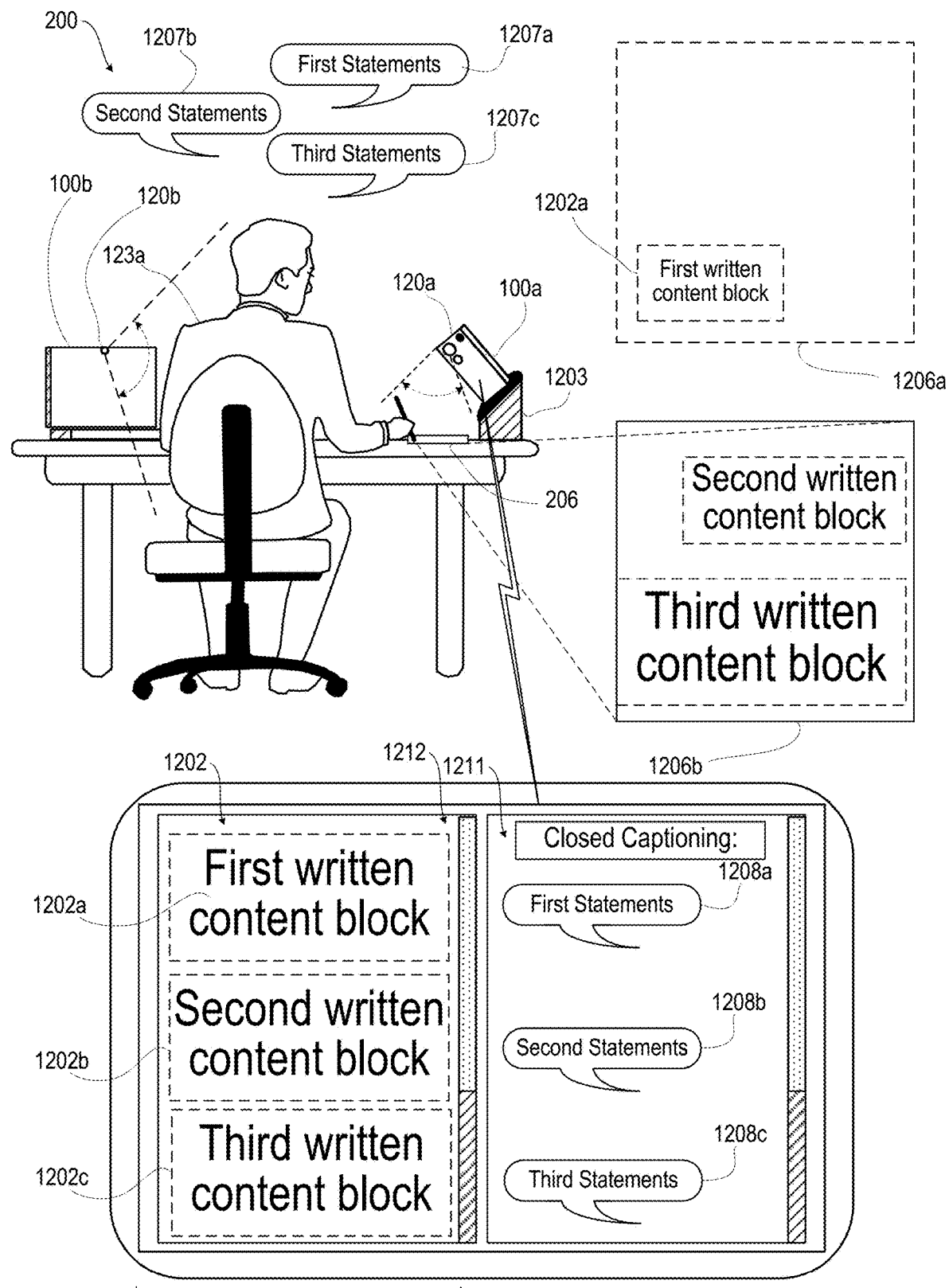
FIG. 12 depicts a front view of the example communication environment that captures and resizes written content and captures speech as closed captioning, according to one or more embodiments.

FIG. 12 depicts a front view of example communication environment 200 (FIG. 2) that captures and presents resized written content and presents accompanying speech as closed captioning. Communication device 100a has image capturing device 120a positioned by dock 1203 to have an FOV the incorporates writing surface 206. Communication device 100b is positioned to have local participant 123a incorporated within the FOV of image capturing device 120b. Local participant 123a sequentially creates first, second, and third written content blocks 1202a-1202c (collectively 1202). In a first instance or on a first sheet 1206a of writing surface 206, local participant 123a creates first written content block 1202a of a small size. Local recipient speaks audio output segments 1207a-1207c in conjunction with creating first written content block 1202a. Controller 110 (FIG. 1) captures first audio output segment 1207a as first closed captioning segment 1208a. After erasing writing surface 206 or removing first sheet 1206a to expose or place second sheet 1206b, local participant 123a creates second written content block 1202b of a medium size. Local recipient speaks second audio output segment 1207b in conjunction with creating second written content block 1202b. Controller 110 (FIG. 1) captures second audio output segment 1207b as second closed captioning segment 1208b. Then local participant 123a creates third written content block 1202c of a large size. Local recipient speaks third audio output segment 1207c in conjunction with creating third written content block 1202c. Controller 110 (FIG. 1) captures third audio output segment 1207c as third closed captioning segment 1208c. For clarity, three written content blocks 1202a-1202c are depicted with three corresponding closed captioning segment 1208a-1208c. In other embodiments, various sizes and combinations of written content blocks and different instances of audio output segments can occur. In an example, the teacher may not speak when writing particular written content blocks or closed captioning may not be captured. In one or more embodiments, the written content blocks can be converted to text using optical character recognition to provide a uniform typeface and size. The presentation of written content in sequential format can be presented separate from any closed captioning. In another example, closed captioning can be captured and presented as a standalone presentation item activated by a remote participant. In an additional example, closed captioning can be activated by remote participants who have hearing difficulties for presenting live in lieu of or in addition to audio presentation.

To assist remote participants 123b (FIG. 2) with following or receiving the sequence of written content blocks in a cohesive manner, controller 110 (FIG. 1) resizes and places in sequential order written content blocks 1202a-1202c as uniform written content 1211. Closed captioning segments 1208a-1208c are aligned or interleaved with the corresponding written comment blocks 1202a-1202c in uniform written content 1211 to create transcript 1212.

Figure 13:
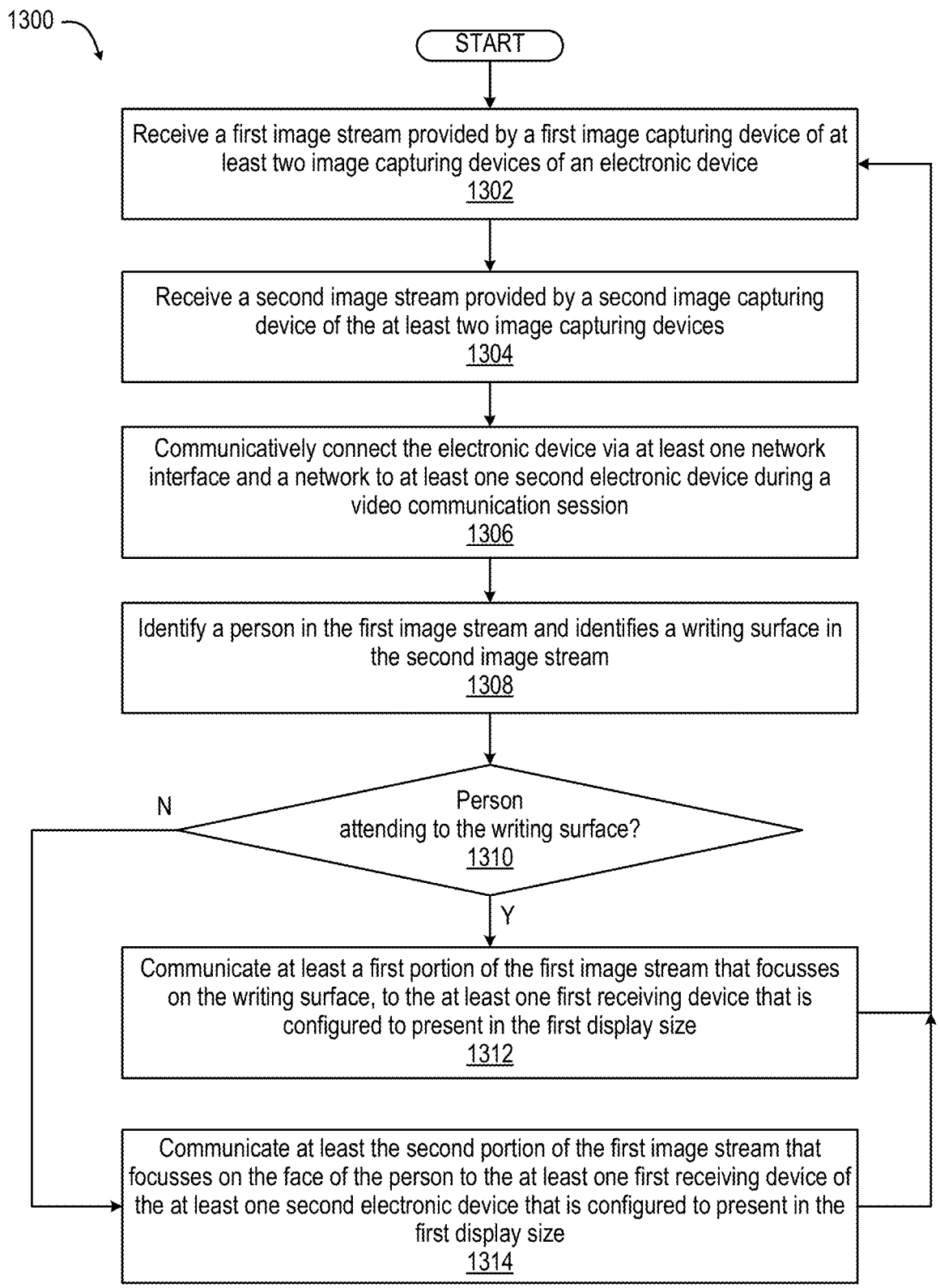
FIG. 13 depicts a flow diagram of a method for automatically selecting a relevant locally available image stream among more than one image streams to transmit to a video communication session, according to one or more embodiments.

FIG. 13 depicts a flow diagram of a method for automatically selecting the more relevant or meaningful locally available image stream for instruction among more than one image stream to transmit to a video communication session. In at least one embodiment, communication device 100, managed by controller 110, executes video conference application 114, configuring communication device 100 (FIG. 1) to facilitate a video communication session by performing functionality of methods 1300, 1400 and 1500 respectively depicted in FIGS. 13-15. The description of methods 1300, 1400 and 1500 is provided with general reference to the specific components illustrated within the preceding FIGS. 1-15, and specific components referenced in methods 1300, 1400 and 1500 may be identical or similar to components of the same name used in describing preceding FIGS. 1-12.

Method 1300 includes receiving a first image stream provided by a first image capturing device of at least two image capturing devices of an electronic device (block 1302). Method 1300 includes receiving a second image stream provided by a second image capturing device of the at least two image capturing devices (block 1304). Method 1300 includes communicatively connecting the electronic device via at least one network interface and a network to at least one second electronic device during a video communication session (block 1306). Method 1300 includes identifying a person in the first image stream and identifying a writing surface in the second image stream (block 1308).

Method 1300 includes determining whether the person is attending to the writing surface (decision block 1310). In one or more embodiments, method 1300 includes determining that the person is not attending to the writing surface is in response to determining that the person is gazing toward at least one display device that incorporates the second image capturing device. In one or more embodiments, method 1300 includes determining that the person is attending to the writing surface in response to identifying one hand of the person in the second image stream proximate to the writing surface and that the person is gazing toward the one hand that is identified. In one or more embodiments, method 1300 includes determining that the person is attending to the writing surface by identifying at least one of (i) a hand of the person in proximity to the writing surface and (ii) written content being added to the writing surface.

In response to determining that the person is attending to the writing surface, method 1300 includes communicating at least a first portion of the first image stream that focusses on the writing surface, to the at least one first receiving device of the at least one second electronic device (block 1312). Then method 1300 proceeds to block 1302.

In response to determining that the person is not attending to the writing surface, method 1300 includes communicating during the video communication session at least the second portion of the first image stream that focusses on the face of the person to at least the first receiving device of the at least one second electronic device (block 1314). Then method 1300 proceeds to block 1302.

Figure 14:
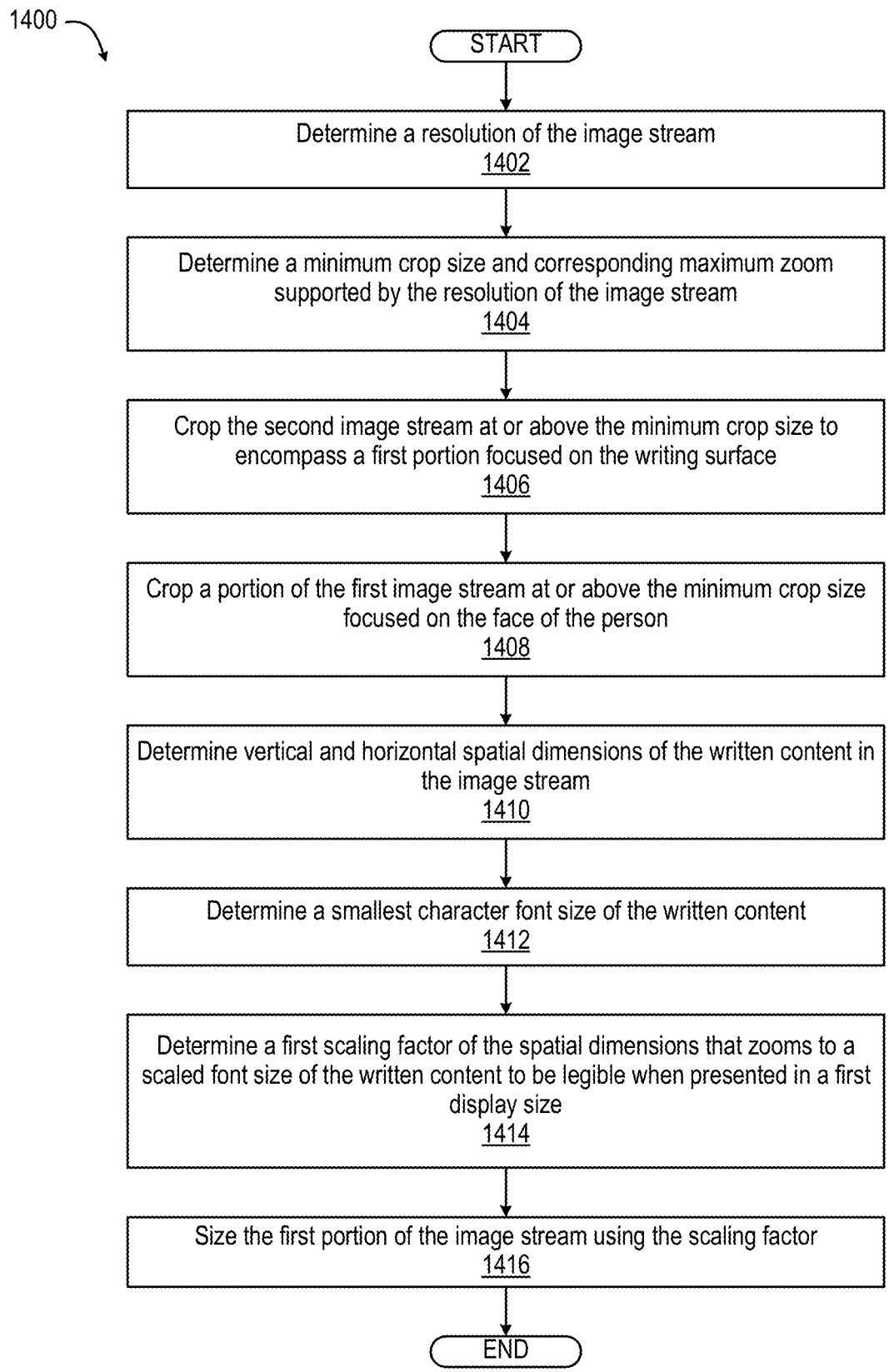
FIG. 14 depicts a flow diagram of a method for resizing portions of written content transmitted to the video communication session, according to one or more embodiments.

FIG. 14 depicts a flow diagram of method 1400 that provides additional functionality to method 1300 (FIG. 13) by automatically resizing written content for legibility when presented on a second electronic device. Method 1400 includes determining a resolution of the image stream (block 1402). Method 1400 includes determining a minimum crop size and corresponding maximum zoom supported by the resolution of the image stream (block 1404). Method 1400 includes cropping the second image stream at or above the minimum crop size to encompass a first portion focused on the writing surface (block 1406). Method 1400 includes cropping a portion of the first image stream at or above the minimum crop size focused on the face of the person (block 1408). One or both of the cropped portions encompass the meaningful content of the image stream, enabling transmissions of a reduced amount of image data and enabling a receiving second device to legibly present the meaningful content on a small display screen. Method 1400 includes determining vertical and horizontal spatial dimensions of the written content in the image stream (block 1410). Method 1400 includes determining a smallest character font size of the written content (block 1412). Method 1300 includes determining a first scaling factor of the vertical and horizontal spatial dimensions that zooms to a scaled font size of the written content to be legible when presented in a first display size by the at least one first receiving device of the at least one second electronic device (block 1414). Method 1400 includes sizing the first portion of the image stream using the first scaling factor (block 1416). In one or more embodiments, the scaling for legibility can result in a window that is too big for simultaneous viewing of all content on the second communication device of the first display size. A user interface that presents the video communication session at the second communication device can present pan or scroll controls that enable a remote participant to view different portions of the presented portion of the image stream to view the full content. Then method 1400 ends.

Figure 15:
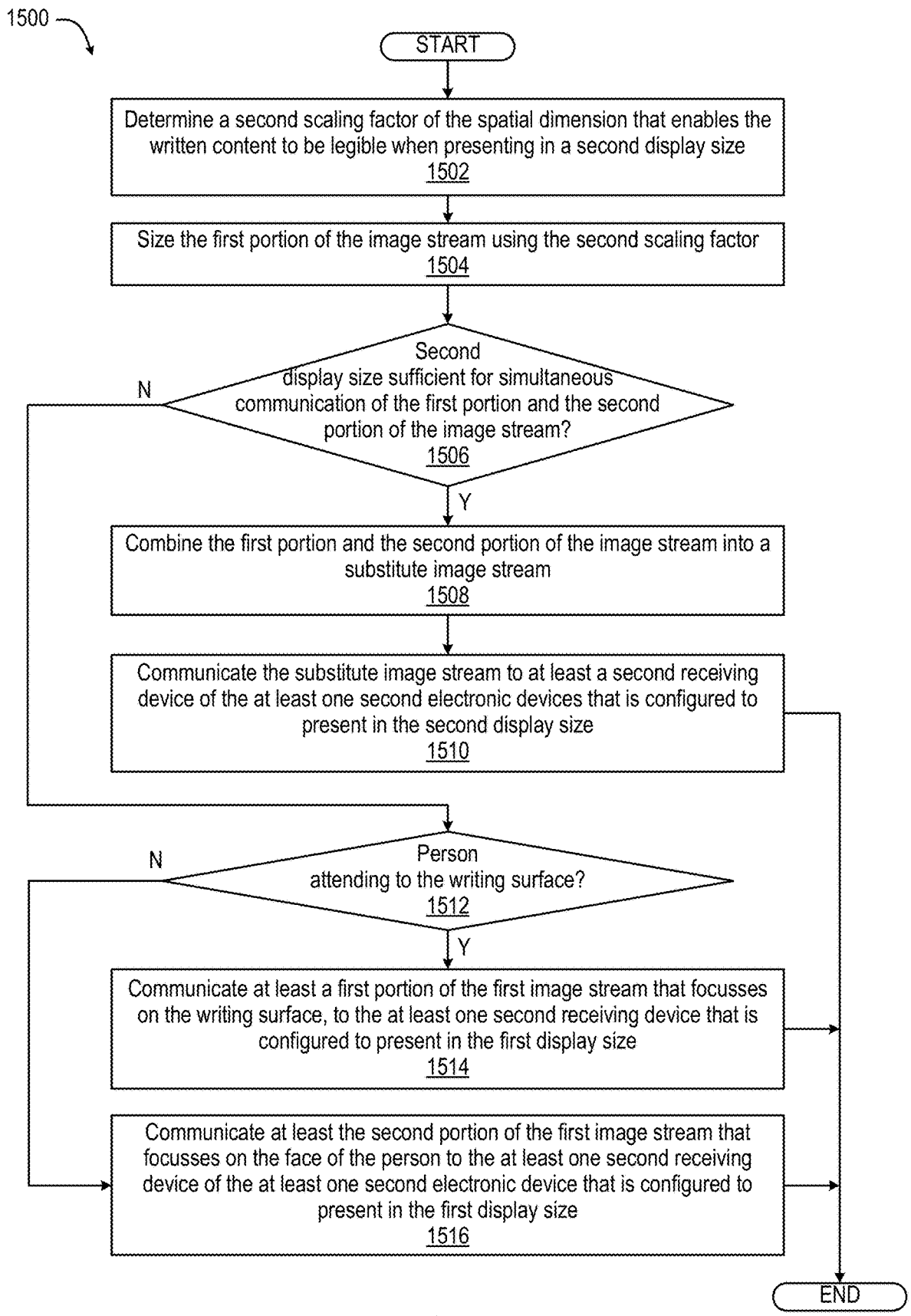
FIG. 15 depicts a flow diagram of a method for customizing visual content transmitted to a population of the remote (receiving) environment of the example communication environment that includes at least second communication devices having display devices of different sizes, according to one or more embodiments.

FIG. 15 depicts method 1500 that provides additional functionality to method 1300 (FIG. 1300) and method 1400 (FIG. 14) by sizing visual content for more than one size of second electronic device. For clarity, method 1500 is described as supporting two subsets of second electronic devices that have two different display sizes. At least one first receiving device of the at least one second electronic device has a first smaller display size that can only support one of the two portions of the image stream. At least one second receiving device of the at least one second electronic device has a second larger display size that is larger than the first display device. The at least one second receiving device benefits from the focussing on the meaningful content but has additional display capacity that can be used. Aspects of the present disclosure can be applied to additional sizes of second electronic devices such as three or more different sizes. Aspects of the present disclosure can also be applied to a population of second electronic devices that have the same display size, enabling the electronic device to communicate the same transmitted image stream to the population of similar or identical receiving devices.

Method 1500 includes determining a second scaling factor of the spatial dimension that enables the written content to be legible when presented in a second display size by the at least one second receiving device of the at least one second electronic device (block 1502). The second display size is different size from the first display size. In one or more embodiments, the second display size is larger than the first display size in one or both of horizontal and vertical dimensions. In one or more embodiments, scaling of content sent to the first receiving device and the second receiving device also enables presenting content legibly in both portrait and landscape aspect ratios. Depending on the aspect ratio and respective horizontal and vertical dimensions of both the written content, scaling can require creating vertical and/or horizontal scrolling to be presentable within the second display size.

Method 1500 includes sizing the first portion of the image stream using the second scaling factor (block 1504). Method 1500 includes determining whether the second display size is sufficient for simultaneous communication of the first portion and the second portion of the image stream (decision block 1506). In response to determining that the second display size is sufficient for simultaneous communication of the first portion and the second portion of the image stream, method 1500 includes combining the first portion and the second portion of the image stream into a substitute image stream (block 1508). Method 1500 includes communicating the substitute image stream to at least a second receiving device of the at least one second electronic devices that is configured to present in the second display size (block 1510). Then method ends. In response to determining that the second display size is insufficient for simultaneous communication of the first portion and the second portion of the image stream, method 1500 includes determining whether the person is attending to the writing surface (decision block 1512). In response to determining that the person is attending to the writing surface, method 1500 includes communicating at least the first portion of the first image stream that focusses on the writing surface, to the at least one first receiving device of the at least one second electronic device (block 1514). Then method 1500 ends. In response to determining that the person is not attending to the writing surface, method 1500 includes communicating during the video communication session at least the second portion of the first image stream that focusses on the face of the person to at least the first receiving device of the at least one second electronic device (block 1516). Then method 1500 ends.

In one or more embodiments, method 1500 includes receiving a first image stream provided by a first image capturing device of at least two image capturing devices of an electronic device. Method 1500 includes receiving a second image stream provided by a second image capturing device of the at least two image capturing devices. Method 1500 includes communicatively connecting the electronic device with at least one network interface via a network to at least one second electronic device during a video communication session. Method 1500 includes identifying a person in the first image stream and identifies a writing surface in the second image stream. In response to determining that the person is not attending to the writing surface, method 1500 includes communicating, to at least a first particular second electronic device, during the video communication session, at least a first portion of the first image stream that focusses on a face of the person. In response to determining that the person is attending to the writing surface, method 1500 includes communicating, to at least the first particular second electronic device during the video communication session, at least a second portion of the second image stream that focusses on the writing surface.

In one or more embodiments, method 1500 includes determining that the person is not attending to the writing surface in response to determining that the person is gazing toward at least one display device that incorporates the second image capturing device. In one or more embodiments, method 1500 includes identifying one hand of the person in the second image stream proximate to the writing surface. Method 1500 includes determining that the person is attending to the writing surface in response to determining that the person is gazing toward the one hand that is identified. In one or more embodiments, method 1500 includes determining that the person is attending to the writing surface by identifying at least one of (i) a hand of the person in proximity to the writing surface and (ii) written content being added to the writing surface. In one or more embodiments, in response to determining that the person is not attending to the writing surface, method 1500 includes cropping the at least the first portion of the first image stream to focus on the face of the person. In response to determining that the person is attending to the writing surface, method 1500 includes cropping the at least the second portion of the second image stream to focus on the writing surface.

In one or more embodiments, method 1500 includes determining a spatial dimension of written content on the writing surface incorporated in the image stream. Method 1500 includes determining a first scaling factor of the spatial dimension that enables the written content to be legible when presented in a first display size by a first receiving device of the at least one second electronic device. Method 1500 includes sizing the first portion of the image stream using the first scaling factor. Method 1500 includes communicating a resized version of the first portion with the first scaling factor applied. In one or more particular embodiments, method 1500 includes determining a second scaling factor of the spatial dimension that enables the written content to be legible when presented in a second display size by a second receiving device of the at least one second electronic device. The second display size is a different size than the first display size. Method 1500 includes sizing the first portion of the image stream using the second scaling factor. Method 1500 includes communicating a resized version of the first portion with the second scaling factor applied. In a specific embodiment, the second display size is larger than the first display size and supports simultaneous communication of the first portion and the second portion of the image stream. Method 1500 further includes combining the first portion and the second portion of the image stream into a substitute image stream. Method 1500 includes communicating the substitute image stream to the second receiving device of the at least one second electronic devices.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. An electronic device comprising:
   at least two image capturing devices, including a first image capturing device providing a first image stream and a second image capturing device providing a second image stream;
   at least one network interface that communicatively connects the electronic device via a network to at least one second electronic device during a video communication session; and
   a controller communicatively coupled to each of the at least two image capturing devices and the at least one network interface, and which:
      during the video communication session with the at least one second electronic device, identifies a person in the first image stream and identifies a writing surface in the second image stream;
      determines whether the person is attending to the writing surface;
      in response to determining that the person is not attending to the writing surface, automatically selects and communicates, to at least a first particular second electronic device during the video communication session, at least a first portion of the first image stream that focusses on a face of the person; and
      in response to determining that the person is attending to the writing surface, automatically selects and communicates, to at least the first particular second electronic device during the video communication session, at least a second portion of the second image stream that focusses on the writing surface.

2. The electronic device of claim 1, further comprising at least one display device communicatively coupled to the controller and having the second image capturing device incorporated therein, wherein the controller:
   determines that the person is not attending to the writing surface in response to determining that the person is gazing toward the at least one display device.

3. The electronic device of claim 1, wherein the controller:
   identifies one hand of the person in the second image stream proximate to the writing surface; and
   determines that the person is attending to the writing surface in response to determining that the person is gazing toward the one hand that is identified.

4. The electronic device of claim 1, wherein in determining that the person is attending to the writing surface, the controller identifies at least one of (i) a hand of the person in proximity to the writing surface and (ii) written content being added to the writing surface.

5. The electronic device of claim 1, wherein the controller:

in response to determining that the person is not attending to the writing surface, crops the at least the first portion of the first image stream to focus on the face of the person; and in response to determining that the person is attending to the writing surface, crops the at least the second portion of the second image stream to focus on the writing surface.

6. The electronic device of claim 1, wherein the controller:

determines a spatial dimension of written content on the writing surface incorporated in the image stream;

determines a first scaling factor of the spatial dimension that enables the written content to be legible when presented in a first display size by a first receiving device of the at least one second electronic device;

sizes the first portion of the image stream using the first scaling factor; and transmits, to the first receiving device, a resized version of the first portion with the first scaling factor applied.

7. The electronic device of claim 6, wherein the controller:

determines a second scaling factor of the spatial dimension that enables the written content to be legible when presented in a second display size by a second receiving device of the at least one second electronic device, the second display size being a different size than the first display size;

sizes the first portion of the image stream using the second scaling factor; and communicates, to the second receiving device, a resized version of the first portion with the second scaling factor applied.

8. The electronic device of claim 7, wherein the second display size is larger than the first display size and supports simultaneous presentation of the first portion and the second portion of the image stream, and the controller:

combines the first portion and the second portion of the image stream into a substitute image stream; and communicates the substitute image stream to the second receiving device of the at least one second electronic devices.

9. A method comprising:

receiving a first image stream provided by a first image capturing device of at least two image capturing devices of an electronic device;

receiving a second image stream provided by a second image capturing device of the at least two image capturing devices;

communicatively connecting the electronic device with at least one network interface via a network to at least one second electronic device during a video communication session;

identifying a person in the first image stream and identifies a writing surface in the second image stream;

determining whether the person is attending to the writing surface;

in response to determining that the person is not attending to the writing surface, communicating, to at least a first particular second electronic device, during the video communication session, at least a first portion of the first image stream that focusses on a face of the person; and in response to determining that the person is attending to the writing surface, communicating, to at least the first particular second electronic device during the video communication session, at least a second portion of the second image stream that focusses on the writing surface.

10. The method of claim 9, wherein determining that the person is not attending to the writing surface is in response to determining that the person is gazing toward at least one display device that incorporates the second image capturing device.

11. The method of claim 9, further comprising:

identifying one hand of the person in the second image stream proximate to the writing surface; and determining that the person is attending to the writing surface in response to determining that the person is gazing toward the one hand that is identified.

12. The method of claim 9, wherein determining that the person is attending to the writing surface comprises identifying at least one of (i) a hand of the person in proximity to the writing surface and (ii) written content being added to the writing surface.

13. The method of claim 9, further comprising:

in response to determining that the person is not attending to the writing surface, cropping the at least the first portion of the first image stream to focus on the face of the person; and in response to determining that the person is attending to the writing surface, cropping the at least the second portion of the second image stream to focus on the writing surface.

14. The method of claim 9, further comprising:

determining a spatial dimension of written content on the writing surface incorporated in the image stream;

determining a first scaling factor of the spatial dimension that enables the written content to be legible when presented in a first display size by a first receiving device of the at least one second electronic device;

sizing the first portion of the image stream using the first scaling factor; and communicating, to the first receiving device, a resized version of the first portion with the first scaling factor applied.

15. The method of claim 14, further comprising:

determining a second scaling factor of the spatial dimension that enables the written content to be legible when presented in a second display size by a second receiving device of the at least one second electronic device, the second display size being a different size than the first display size;

sizing the first portion of the image stream using the second scaling factor; and communicating, to the second receiving device, a resized version of the first portion with the second scaling factor applied.

16. The method of claim 15, wherein the second display size is larger than the first display size and supports simultaneous presentation of the first portion and the second portion of the image stream, and the method further comprises:

combining the first portion and the second portion of the image stream into a substitute image stream; and communicating the substitute image stream to the second receiving device of the at least one second electronic devices.

17. A computer program product comprising:

a computer readable storage device; and program code on the computer readable storage device that when executed by a processor associated with an electronic device, the program code enables the electronic device to provide functionality of:

receiving a first image stream provided by a first image capturing device of at least two image capturing devices of an electronic device;

receiving a second image stream provided by a second image capturing device of the at least two image capturing devices;

communicatively connecting the electronic device with at least one network interface via a network to at least one second electronic device during a video communication session;

identifying a person in the first image stream and identifying a writing surface in the second image stream;

determining whether the person is attending to the writing surface;

in response to determining that the person is not attending to the writing surface, communicating, to at least a first particular second electronic device during the video communication session, at least a first portion of the first image stream that focusses on a face of the person; and in response to determining that the person is attending to the writing surface, communicating, to at least the first particular second electronic device during the video communication session, at least a second portion of the second image stream that focusses on the writing surface.

18. The computer program product of claim 17, wherein the program code enables the electronic device to provide the functionality of determining that the person is not attending to the writing surface is in response to determining that the person is gazing toward at least one display device that incorporates the second image capturing device.

19. The computer program product of claim 17, wherein the program code enables the electronic device to provide the functionality of:

identifying one hand of the person in the second image stream proximate to the writing surface; and determining that the person is attending to the writing surface in response to determining that the person is gazing toward the one hand that is identified.

20. The computer program product of claim 17, wherein the program code enables the electronic device to provide the functionality of determining that the person is attending to the writing surface by identifying at least one of (i) a hand of the person in proximity to the writing surface and (ii) written content being added to the writing surface.

* * * * *